(12) United States Patent
Rabb et al.

(10) Patent No.: US 10,324,355 B2
(45) Date of Patent: Jun. 18, 2019

(54) DEVICES AND METHODS FOR IMPLEMENTING AN OPTICAL SWITCHING ENGINE

(71) Applicant: OHIO STATE INNOVATION FOUNDATION, Columbus, OH (US)

(72) Inventors: David Rabb, Wright-Patterson Air Force Base, OH (US); Betty Lise Anderson, Gahanna, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 19 days.

(21) Appl. No.: 15/492,225

(22) Filed: Apr. 20, 2017

(65) Prior Publication Data

US 2017/0307955 A1    Oct. 26, 2017

Related U.S. Application Data

(60) Provisional application No. 62/325,527, filed on Apr. 21, 2016.

(51) Int. Cl.
*G02F 1/00* (2006.01)
*G02F 1/01* (2006.01)
(Continued)

(52) U.S. Cl.
CPC .............. *G02F 1/31* (2013.01); *G02B 26/00* (2013.01); *G02B 27/283* (2013.01);
(Continued)

(58) Field of Classification Search
CPC . G02F 1/00; G02F 1/0136; G02F 1/29; G02F 1/31; G02F 2001/291; G02F 2001/294; G02F 2001/295; G02F 2001/2955; G02F 2201/30; G02F 2201/307; G02F 2201/34; G02B 27/00;
(Continued)

(56) References Cited

U.S. PATENT DOCUMENTS 6,266,176 B1 *  7/2001  Anderson .......... G02B 27/0087
                                                        359/237
6,388,815 B1 *  5/2002  Collins, Jr. ....... G02B 27/0087
                                                        359/237
(Continued)

OTHER PUBLICATIONS

International Search Report for PCT/US17/52237 dated Dec. 4, 2017.
(Continued)

*Primary Examiner* — Loha Ben
(74) *Attorney, Agent, or Firm* — Fay Sharpe LLP

(57) ABSTRACT

Disclosed herein are various improvements in optical switching engines. In one aspect, a range of switching engines includes various multiple bounce, multiple image devices, such as, for example, the Herriott Cell and the Robert Cell. In another aspect, liquid crystal spatial light modulators (SLMs) are used in the switching engine of an optical cross-connect. In another aspect, polarization gratings (PGs) are used in the switching engine. In another aspect, a switching engine includes a Fourier cell using SLMs with more than two states. Alternative imaging optics in a Fourier cell implementing a multiple-bounce, multiple image device are also disclosed.

24 Claims, 16 Drawing Sheets

(51) Int. Cl.
*G02F 1/31* (2006.01)
*G02B 26/00* (2006.01)
*G02B 26/08* (2006.01)
*G02B 27/28* (2006.01)
*G02B 27/42* (2006.01)
*G02B 27/46* (2006.01)
*G02B 5/08* (2006.01)

(52) U.S. Cl.
CPC ....... *G02B 27/4261* (2013.01); *G02F 1/0136* (2013.01); *G02B 26/0808* (2013.01); *G02B 27/28* (2013.01); *G02B 27/46* (2013.01); *G02F 1/00* (2013.01); *G02F 2201/30* (2013.01); *G02F 2201/307* (2013.01); *G02F 2201/34* (2013.01)

(58) Field of Classification Search
CPC ........ G02B 27/22; G02B 27/26; G02B 27/28; G02B 27/283; G02B 27/285; G02B 27/4261; G02B 27/46; G02B 26/00; G02B 5/30; G02B 26/0808; G02B 5/08; G02B 5/18; G06E 3/003
USPC ......... 359/237, 245, 29, 559, 566, 569, 572, 359/573, 290, 291, 292, 295, 630, 631, 359/633, 872, 877, 485.01, 485.07, 359/487.04, 201.1, 201.2, 204.1–204.5, 359/207.9, 485.02, 850, 851, 855–857; 348/758
See application file for complete search history.

(56) References Cited

U.S. PATENT DOCUMENTS

| | | | |
|---|---|---|---|
| 6,525,889 | B1 | 2/2003 | Collins, Jr. et al. |
| 6,674,939 | B1 | 1/2004 | Anderson et al. |
| 6,724,951 | B1 | 4/2004 | Anderson et al. |
| 6,760,140 | B1 | 7/2004 | Argueta-Diaz et al. |
| 6,952,306 | B1 | 10/2005 | Anderson et al. |
| 7,126,740 | B2 * | 10/2006 | Szczepanek ........... G02B 6/262 359/290 |
| 7,236,238 | B1 | 7/2007 | Durresi |
| 7,430,347 | B2 | 9/2008 | Anderson et al. |
| 7,630,598 | B2 | 12/2009 | Anderson et al. |
| 7,660,499 | B2 | 2/2010 | Anderson et al. |
| 7,911,671 | B2 | 3/2011 | Rabb |
| 8,220,929 | B2 * | 7/2012 | Miyawaki .............. G02B 27/22 348/51 |
| 9,507,174 | B2 * | 11/2016 | Qin .................... G02B 27/2214 |
| 2003/0011769 | A1 | 1/2003 | Rakuljic et al. |
| 2007/0263958 | A1 | 11/2007 | Anderson et al. |
| 2009/0015899 | A1 | 1/2009 | Rabb |
| 2014/0334023 | A1 | 11/2014 | Shi et al. |
| 2015/0185583 | A1 | 7/2015 | Mao et al. |
| 2017/0018215 | A1 * | 1/2017 | Black ....................... G09G 3/02 |

OTHER PUBLICATIONS

Herriott et al., "Off-axis paths in spherical mirrors interferometers," Appl. Opt. vol. 3 No. 4, pp. 523-526 (1964).
Robert, "Simple, stable, and compact multiple-reflection optical cell for very long optical paths," Appl. Opt. vol. 46, No. 22, pp. 5408-5418 (2007).

* cited by examiner (a) Null shift (b) Shift of Δ

DEVICES AND METHODS FOR IMPLEMENTING AN OPTICAL SWITCHING ENGINE

This application claims the benefit of U.S. Provisional Application No. 62/325,527 filed Apr. 21, 2016. U.S. Provisional Application No. 62/325,527 filed Apr. 21, 2016 is incorporated by reference herein in its entirety.

BACKGROUND

True-time delay devices based on the White cell are described in U.S. Pat. Nos. 6,525,889, 6,388,815, 6,674,939, 6,724,951, and 7,430,347. True-time delay devices based on the Robert cell are described in U.S. Ser. No. 14/269,857. True-time delay devices based on the Fourier cell are described in U.S. Pat. No. 7,911,671. Further, optical crossconnects based on the White cell are described in U.S. Pat. Nos. 6,266,176, 6,760,140, and 7,660,499, and based on the Fourier cell are described in U.S. Pat. No. 7,630,598. Apparatuses for using a time delay device as an optical correlator are described in U.S. Pat. No. 6,952,306 and monitoring the quality of optical links in U.S. Pat. No. 7,236,238.

The White cell and the Fourier cell are both free-space optical systems in which arrays of light beams make multiple passes and are re-imaged to arrays of light spots multiple times. Each time the spots are re-imaged, they can be made to land on a pixelated optical spatial light modulator (SLM) of some type. The SLM changes some property of the beam landing on each pixel to change the path of that beam. Then, depending on the path a beam takes, some optical operation is performed (or not performed) so as to cause the final state of each output beam to be different in a controllable way.

An example is an optical time-delay device. In this case, the SLM pixel may direct a beam to a "null" path (a path requiring some amount of time to cross the cell and return to the SLM), or to a delay path, in which case the beam takes a specified longer amount of time to return, and, thus, has a delay relative to a beam that took a null path. Another example is an optical cross-connect. Here, a beam may be returned to a location in a row or column that corresponds directly to its initial row or column, or may be "switched" to return to a different row or column.

In both cases, beams make multiple passes through the cell, and on each round trip each beam may be switched again. Generally the operation performed on the beam is different each pass, for example on the first pass the time delay (or row or column shift) may be smaller or larger than that on the second pass. By combining delays or shifts or varying sizes, a wide range of time delays (or row or column shifts) may be implemented.

In what follows, the set of components that perform the switching (the choosing of the operations to be performed) will be referred to as the switching engine. For example, the White cell may be a switching engine. The set of components that performs the desired operation (delay, shifting, et cetera) will be called the "operation part." For example, the optical delay elements in a time delay device is the time "operation part."

BRIEF DESCRIPTION

In some illustrative embodiments disclosed as illustrative examples herein, a multiple bounce optical cell comprises optical components arranged to reflect an array of light beams received at an input plane through a plurality of bounces. Each bounce is defined by optical components including: a lens; a pixelated polarization-controlling spatial light modulator (SLM) disposed at a front focal plane of the lens and having pixels controlling polarization states of the light beams of the array of light beams landing on the pixels; at least one mirror disposed at a back focal plane of the lens and arranged to reflect the array of light beams received from the SLM via the lens back through the lens to a next SLM of the next bounce of the plurality of bounces or to an output plane; and a polarization grating (PG) disposed in the optical path of the array of light beams between the SLM and the at least one mirror.

In some illustrative embodiments disclosed as illustrative examples herein, a multiple bounce optical cell comprises optical components arranged to reflect an array of light beams received at an input plane through a plurality of bounces. Each bounce is defined by optical components including: a compound lens; a pixelated polarization-controlling spatial light modulator (SLM) disposed at a front focal plane of the lens and having pixels controlling polarization states of the light beams of the array of light beams landing on the pixels; at least one mirror disposed at a back focal plane of the lens and arranged to reflect the array of light beams received from the SLM via the lens back through the lens to a next SLM of the next bounce of the plurality of bounces or to an output plane; and a switching device comprising at least one polarizing beamsplitter (PBS) or polarization grating (PG) disposed in the optical path of the array of light beams between the SLM and the at least one mirror, the switching device directing the light beams along different paths depending upon the polarization states of the light beams. Each compound lens is a defining optical component of a single bounce of the plurality of bounces.

In some illustrative embodiments disclosed as illustrative examples herein, a multiple bounce optical cell comprises optical components arranged to reflect an array of light beams received at an input plane through a plurality of bounces. Each bounce is defined by optical components including a pixelated polarization-controlling spatial light modulator (SLM), at least one mirror, and a polarization grating (PG) disposed in the optical path of the array of light beams between the SLM and the at least one mirror. In some embodiments, the at least one mirror of each bounce includes at least two mirrors and the PG of each bounce directs each light beam of the array of light beams to one mirror of the at least two mirrors determined by the polarization state of the light beam. In some such embodiments, the at least two mirrors of each bounce includes at least four mirrors and the PG of each bounce comprises a stack of two or more PGs. In some other embodiments, the at least one mirror of each bounce includes a single mirror and the PG of each bounce directs each light beam of the array of light beams having a first polarization state to the single mirror at a first angle and directs each light beam of the array of light beams having a second polarization state to the single mirror at a second angle different from the first angle.

BRIEF DESCRIPTION OF THE DRAWINGS

Unless otherwise noted, the drawings are not to scale or proportion. The drawings are provided only for purposes of illustrating preferred embodiments and are not to be construed as limiting.

DETAILED DESCRIPTION OF PREFERRED EMBODIMENTS

Figure 1:
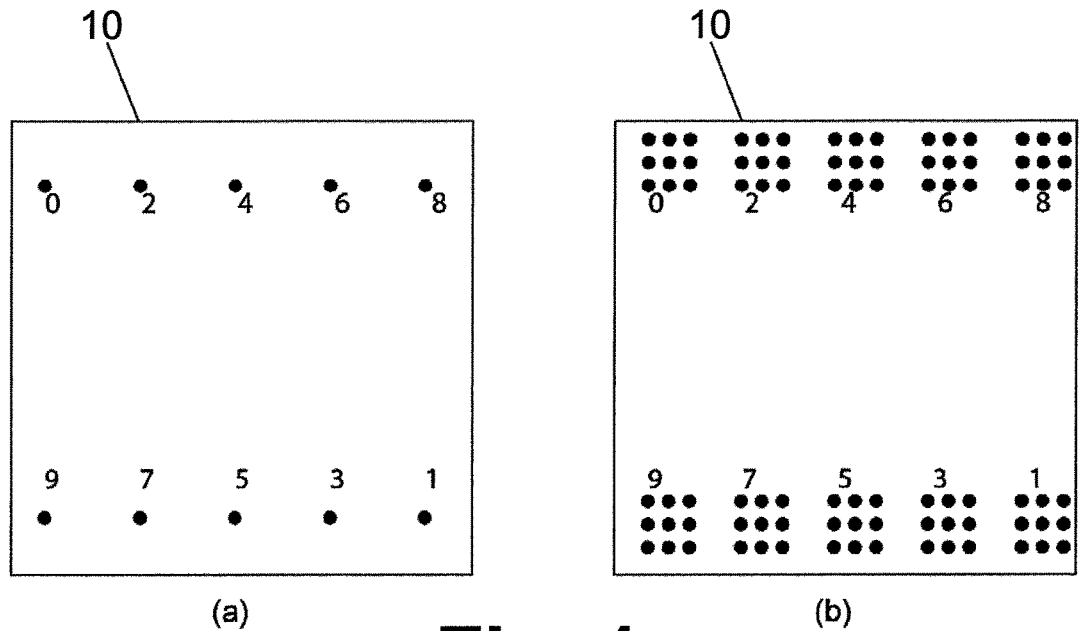
FIGS. 1(a) and 1(b) diagrammatically depict a spot pattern in a White cell for (a) a single input and (b) an array of input spots.

With reference to FIGS. 1(a) and 1(b), in a White cell, an array of input spots is re-imaged multiple times; once on each round trip through the cell. FIG. 1(a) shows the spot pattern on the field mirror 10 for a single input spot; while FIG. 1(b) shows the spot pattern for an array of spots on the field mirror 10. In the White cell, there is one field mirror 10 at one end of the cell, and two objective mirrors at the other end, which are aligned such that subsequent images of the input array appear in two rows in the image plane. In the case of arrays of spots comprising rows and columns, the image plane comprises two rows of images of the input array. Each beam in each bounce lands on a unique pixel of the spatial light modulator (SLM).

Figure 2:
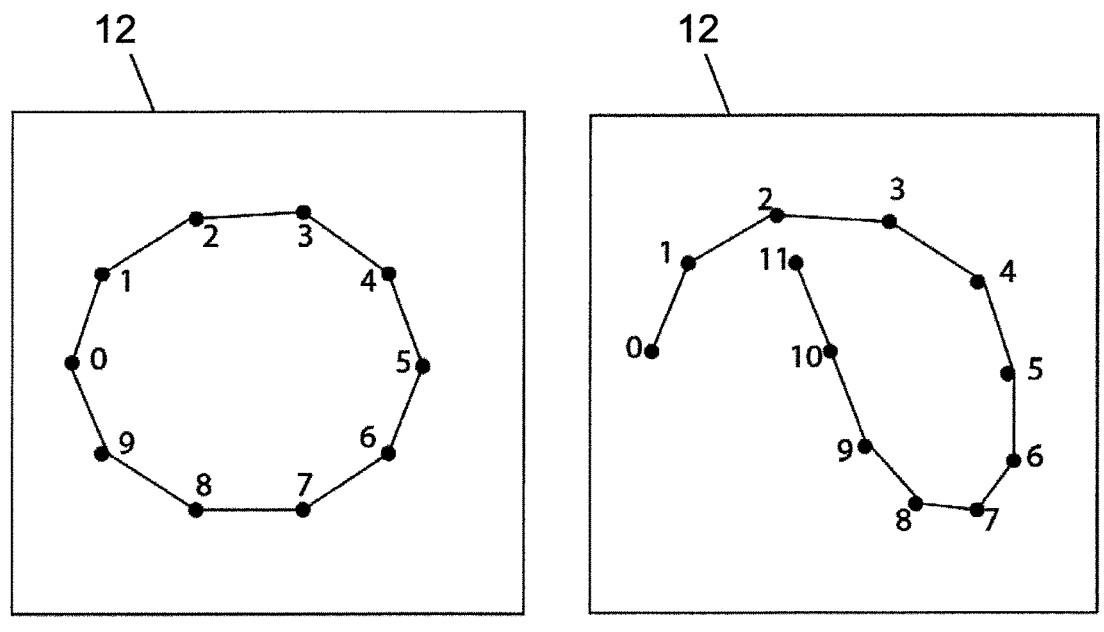
FIGS. 2(a) and 2(b) diagrammatically depict a spot pattern in (a) a Herriott cell and (b) a Robert cell.

With reference to FIGS. 2(a) and 2(b), it is also possible to have a multiple-pass cell containing a single objective mirror, such that subsequent images fall in an ellipse or circle, as seen in FIG. 2(a). FIG. 2(a) shows an individual input spot, but could as well be an array of spots. See Herriott et al., "Off-axis paths in spherical mirrors interferometers," Appl. Opt. vol. 3 no. 4, pp. 523-526(1964). (They may not necessarily be images.) The arrangement of FIG. 2(a) is known as the Herriott cell. There is some periodicity in the spot pattern; eventually the images land on previous images. It is possible to design a Herriott cell such that an input array of spots can be re-imaged after some number of passes; whereupon, the spot array may be incident on a spatial light modulator and, thus, produce a switching engine. The array need not necessarily be rows and columns; the input beams could be arranged in any arbitrary pattern.

Both the White cell and Herriott cell are special cases of the Robert Cell. See Robert, "Simple, stable, and compact multiple-reflection optical cell for very long optical paths," Appl. Opt. vol 46, No. 22, pp. 5408-5418 (2007). In one illustrative Robert cell, the mirror on the input (field) side is split into two mirrors, and one of them is tilted such that its center of curvature is offset from the other. In the most general case, the spot pattern that results appears as "swirls," which successive spots (which may or may not be focused images of the input) may move farther then closer to the center of the input mirrors as the spots progress, or may move outward until they no longer land on the input mirrors. A possible spot pattern on a mirror 12 for a single input is shown in FIG. 2(b). The input may be an array of spots that may be re-imaged at intervals on the field (or objective) mirrors, and SLMs may be placed at those images to provide switching. Thus, a Robert cell can be used as a switching engine as well.

Some known switching engines employ a Fourier cell using micro-electro-mechanical system (MEMS) micro-mirror arrays as a pixelated spatial light modulator in the switching engine. In the following, use of a Liquid Crystal Spatial Light Modulator (LC-SLM) in a Fourier cell is described.

An LC-SLM is a spatial light modulator that can be programmed to locally change the polarization state of a beam that strikes a specific location on the SLM. This is achieved by applying the appropriate voltage to the liquid crystal at that location. The SLM may be transmissive or reflective. It may be birefringent or electro-optically active. In one embodiment, the eigen-polarizations of the liquid crystal are oriented at ±45° with respect to the reference frame. In this case, the phase retardation between the two eigen-polarizations can be varied by changing the applied voltage. For example, if the eigen-polarizations are linearly polarized light in ±45°, and if further the input light is linearly polarized parallel to the horizontal axis (call it x, or the "P" polarization in the reference frame), then by applying one of two voltages, the phase delay between the two eigen-polarizations of the liquid crystal may be set to 180°, in which case the output light is polarized vertically (y) (or "S") or set to 0°, in which case the output light will remain polarized P. A polarizing beamsplitter (PBS) may then be used to send the beam into one of two possible paths.

Figure 3:
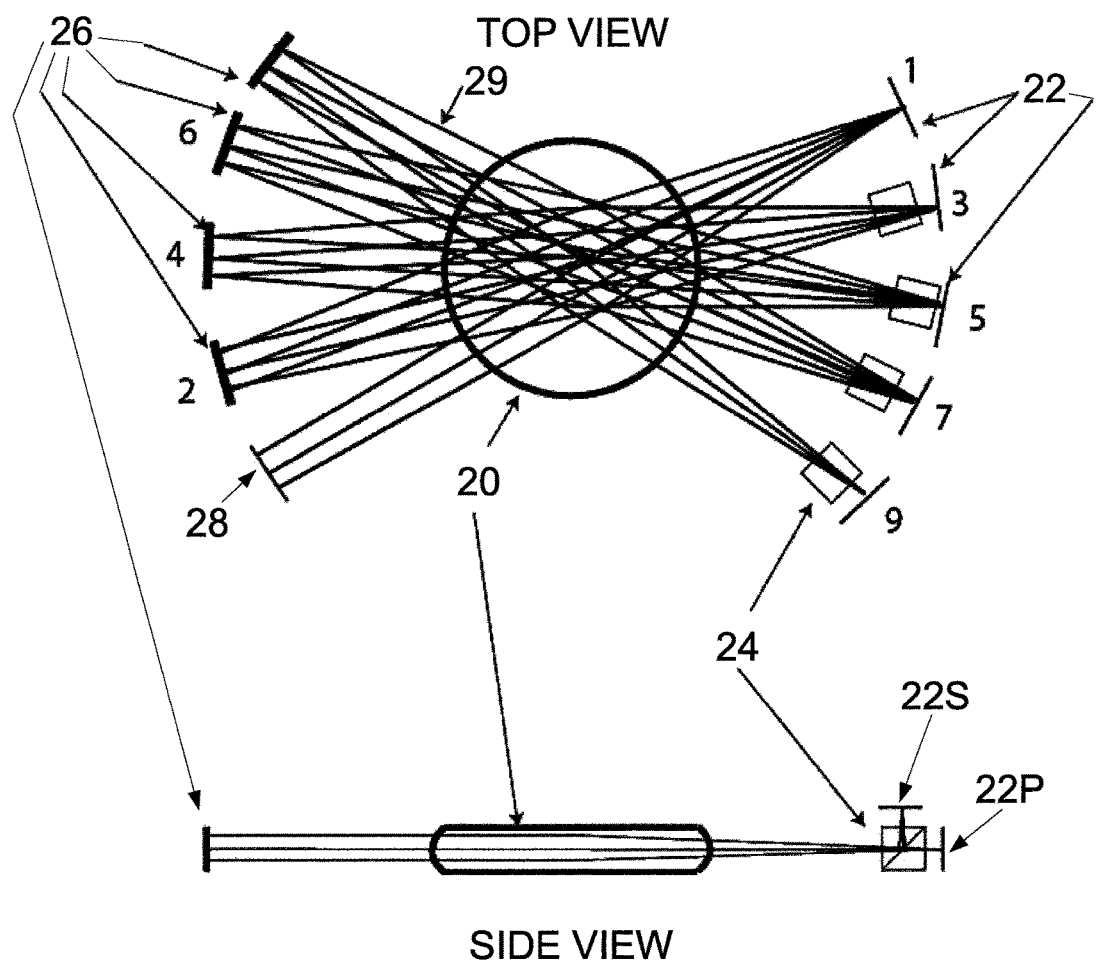
FIG. 3 diagrammatically depicts a Fourier cell switching engine using a liquid crystal spatial light modulator (LC-SLM).

With reference to FIG. 3, one possible configuration for using an LC-SLM in a Fourier cell is illustrated. Components of the Fourier cell switching engine using LC-SLMs shown in FIG. 3 include a disk lens 20, Fourier mirrors 22, polarizing beam splitters 24, and LC-SLMs 26. The optical input is received at an input plane 28 and passes through the cell as light rays 29. As is conventional for a Fourier cell, each SLM is positioned at the object plane of the disk or spherical lens (which is at the focal distance f of the lens from the lens) and each corresponding Fourier mirror is positioned at the Fourier transform plane (which is at the focal distance f of the disk or spherical lens from the lens on the opposite side from the object plane). The Fourier transform of the image at the object plane is thus located at the corresponding Fourier mirror. With the Fourier mirror placed at the location of the Fourier transform plane, the light is reflected back through the disk or spherical lens and the Fourier transform of the transform is located at the original object plane, i.e. at the corresponding SLM. See Rabb, U.S. Pat. No. 7,911,671; Anderson et al., U.S. Pat. No. 7,630,598. The top part of FIG. 3 shows the Fourier cell from the top (i.e., a top view of the Fourier cell). On the left of FIG. 3 are a series of SLMs 26. In the center is the disk or spherical Fourier lens 20. (A disk lens is assumed here for ease of drawing.) At the right are the Fourier mirrors 22. In front of each Fourier mirror 22 is a polarizing beamsplitter (PBS) 24. The bottom of FIG. 3 shows a side view of the Fourier cell. As indicated in this side view, a beam leaving the SLM 26 is set to S or P polarization by the applied voltage on the SLM pixel. The P polarization strikes Fourier mirror 22P and the S polarization strikes mirror 22S. These mirrors may be aligned differently in the case of the cross connect, for example, such that the P-polarized beams are re-imaged to locations corresponding to their original locations in the array, and the S-polarized beams are shifted by some number of rows or columns. For a time-delay device (optical and radar for present purposes), the "S" Fourier mirrors can be replaced by time delay elements.

Figure 4:
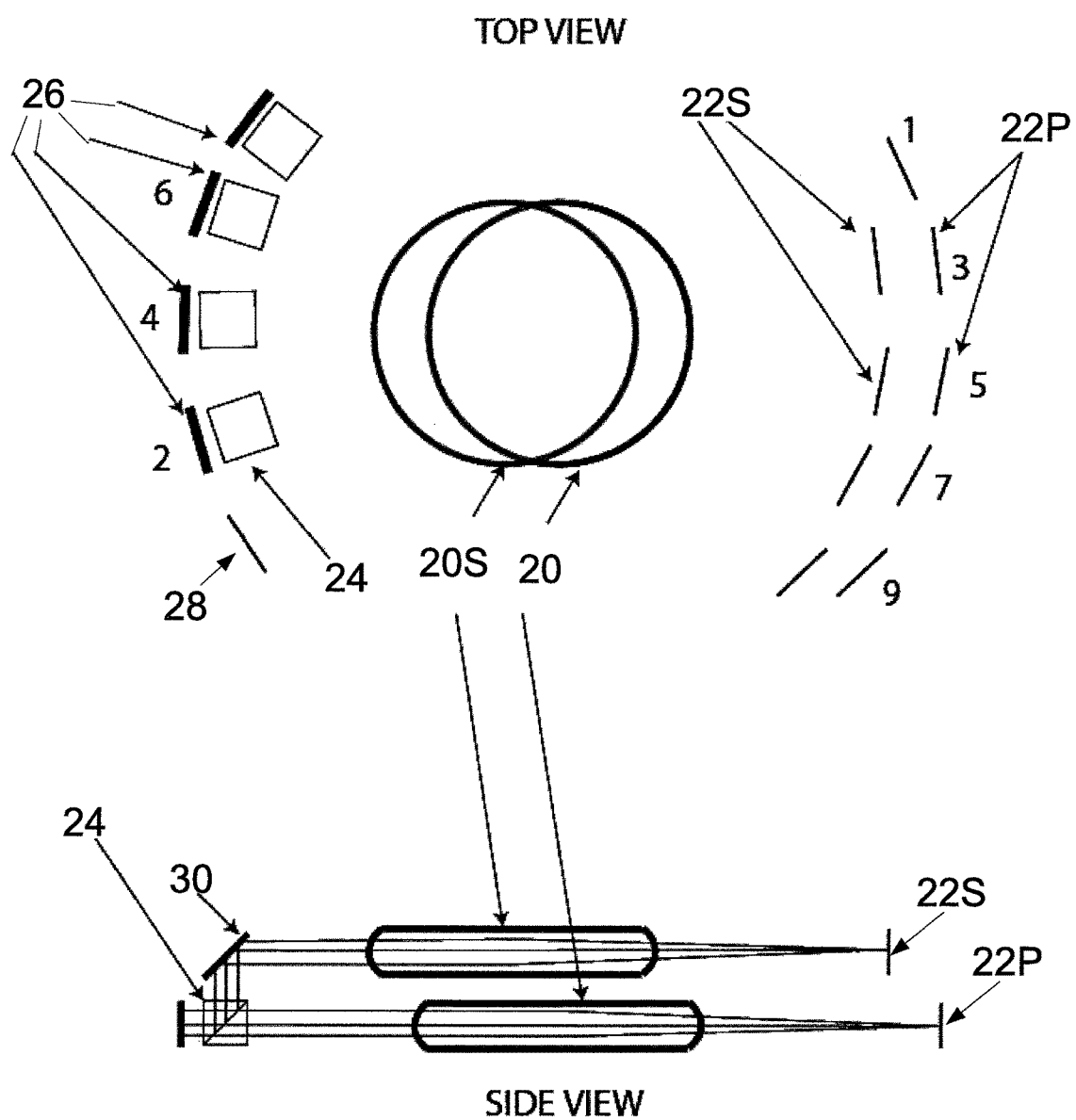
FIG. 4 diagrammatically depicts an alternative Fourier cell configuration using an LC-SLM in which polarizing beam splitters are on the SLM side.

With reference to FIG. 4, alternatively, the beamsplitters 24 may be located on the SLM side of the Fourier cell. In this case, the beam polarizations are switched as in the device of FIG. 3, but now the two polarizations are separated close to the SLM 26. Additional optics are employed in the S polarization path to perform the optical Fourier transforms. FIG. 4 depicts one possible implementation which is to fold the paths using a folding mirror 30 and use a second disk lens 20S. More generally, any optical Fourier-transform-producing optics may be used.

With reference to FIGS. 3 and 4, two illustrative implementations using a birefringent liquid crystal spatial light modulator using linear polarizations as the two states between which the polarizations are switched. Other types of polarization-based SLMs could be used. The principle is the same—the polarization state of a beam is controlled by the applied voltage. Based on the polarization state, a beam is sent into one path or another, and the two different polarizations experience different time delays, column shift, or other property.

Polarization-based SLMs are but one class of spatial light modulator. MEMS constitute another class of SLM. It will be appreciated that any type of spatial light modulator may be used in any of these multiple bounce optical cells.

In the following, Fourier cells using liquid crystal polarization gratings (PGs) are described.

Recently, a new type of optical switch has become available: the polarization grating. These devices alter the path of a beam based on the polarization state. Typically the eigen-polarizations are left-circularly polarized (LCP) light and right-circularly polarized light (RCP). There exist active and passive PGs. In the passive case, the operation of the device is that normally incident LCP light is deflected at (for example) some angle $+\theta$. Normally incident RCP is deflected to the opposite angle $-\theta$. In either case, the polarization state of the beam is changed to the opposite sense of rotation; that is, LCP light is changed to RCP light and vice versa. The magnitude and sign of the angle corresponding to LCP or RCP depends on the details of the fabrication of the device. For an active device, the polarization grating may be erased by the application of a voltage, in which case the beam passes through the PG undeflected regardless of its polarization state.

Figure 5:
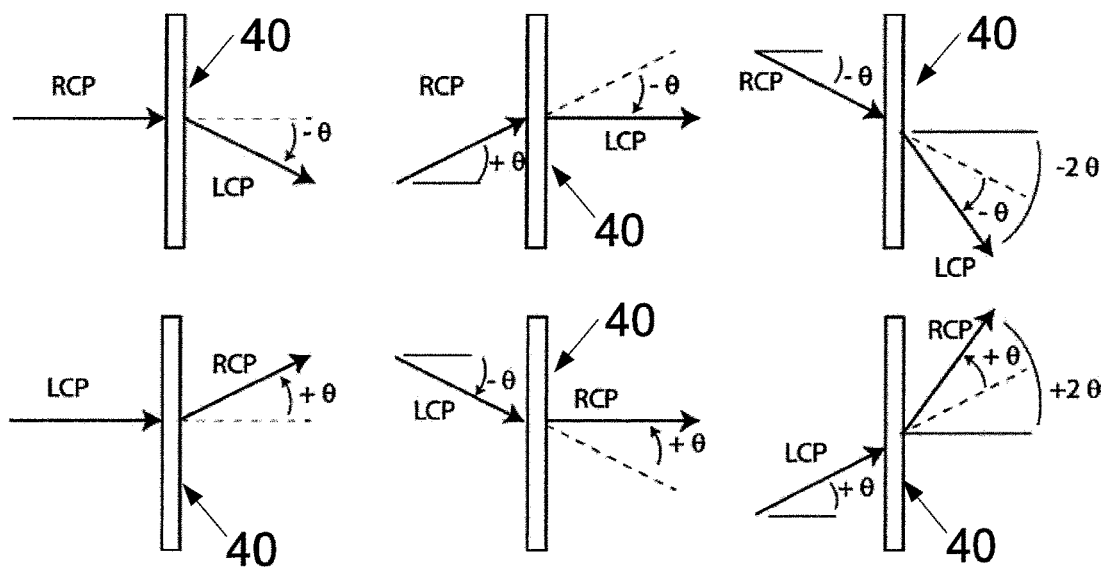
FIG. 5 diagrammatically depicts operation of a passive polarization grating.
Figure 6:
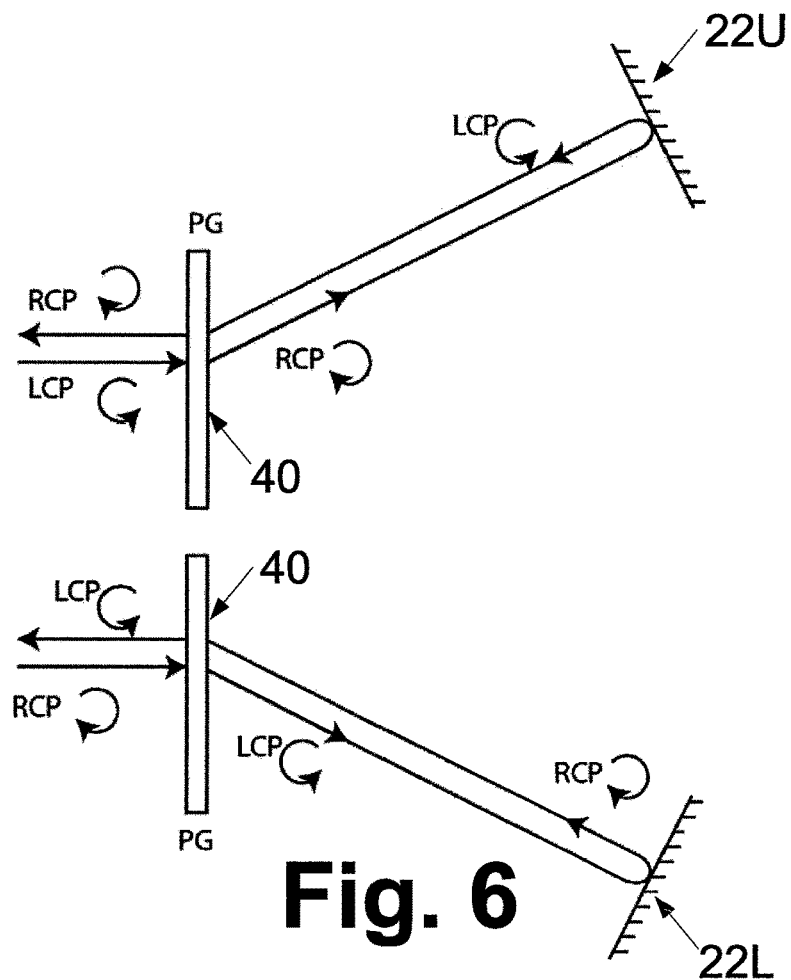
FIG. 6 diagrammatically depicts a passive polarization grating (PG) used in reflective mode.

With reference to FIGS. 5 and 6, while PG's are normally used in transmissive mode, for steering of optical beams, it is disclosed herein how to use them in reflective mode. The following illustrative example uses passive liquid crystal polarization gratings (PGs) 40. For illustrative purposes, it is assumed that the illustrative PG 40 is fabricated such that LCP is deflected by $+\theta$ and RCP is deflected by $-\theta$. When light is not normally incident, but instead incident an angle $+\theta$, we find that when RCP light is diffracted to a direction normal to the plane of the PG 40, as shown in top center of FIG. 5. Light that is incident at $+\theta$, but is LCP, will be deflected upward another $+\theta$; resulting in a final trajectory of $+2\theta$ (FIG. 5 lower right). Similarly, LCP light incident on the PG 40 at $-\theta$ will be diffracted into a direction normal to the plane of the PG 40 (FIG. 5 lower center), and RCP will be diffracted to $-2\theta$ (FIG. 5 upper right).

With reference to FIG. 6, now consider the situation in which the polarization grating 40 is followed by a mirror. In the upper part of FIG. 6, it is assumed for illustration that LCP light is incident normal to the PG 40. It is deflected upward. Recall that the state of polarization (SOP) changes to RCP after the grating. The light travels to an upper mirror 22U. On reflection from the upper mirror 22U, the SOP changes back to LCP. As shown in FIG. 5, it is known that when LC is incident on the PG 40 at a downward angle, it is deflected back to traveling in a direction perpendicular to the plane of the grating. In the bottom part of FIG. 6, it is seen that something similar happens when the input light is RCP. In this case the light is deflected downward by the PG 40 and is reflected at a lower mirror 22L, but on the return pass it goes back to the direction perpendicular to the grating 40.

As described next, the PG 40 can be used in conjunction with a polarization-changing spatial light modulator to produce an optical switch. Such a switch is amenable for use in a White cell, Herriott cell, Robert cell, or Fourier cell switching engine.

Figure 7:
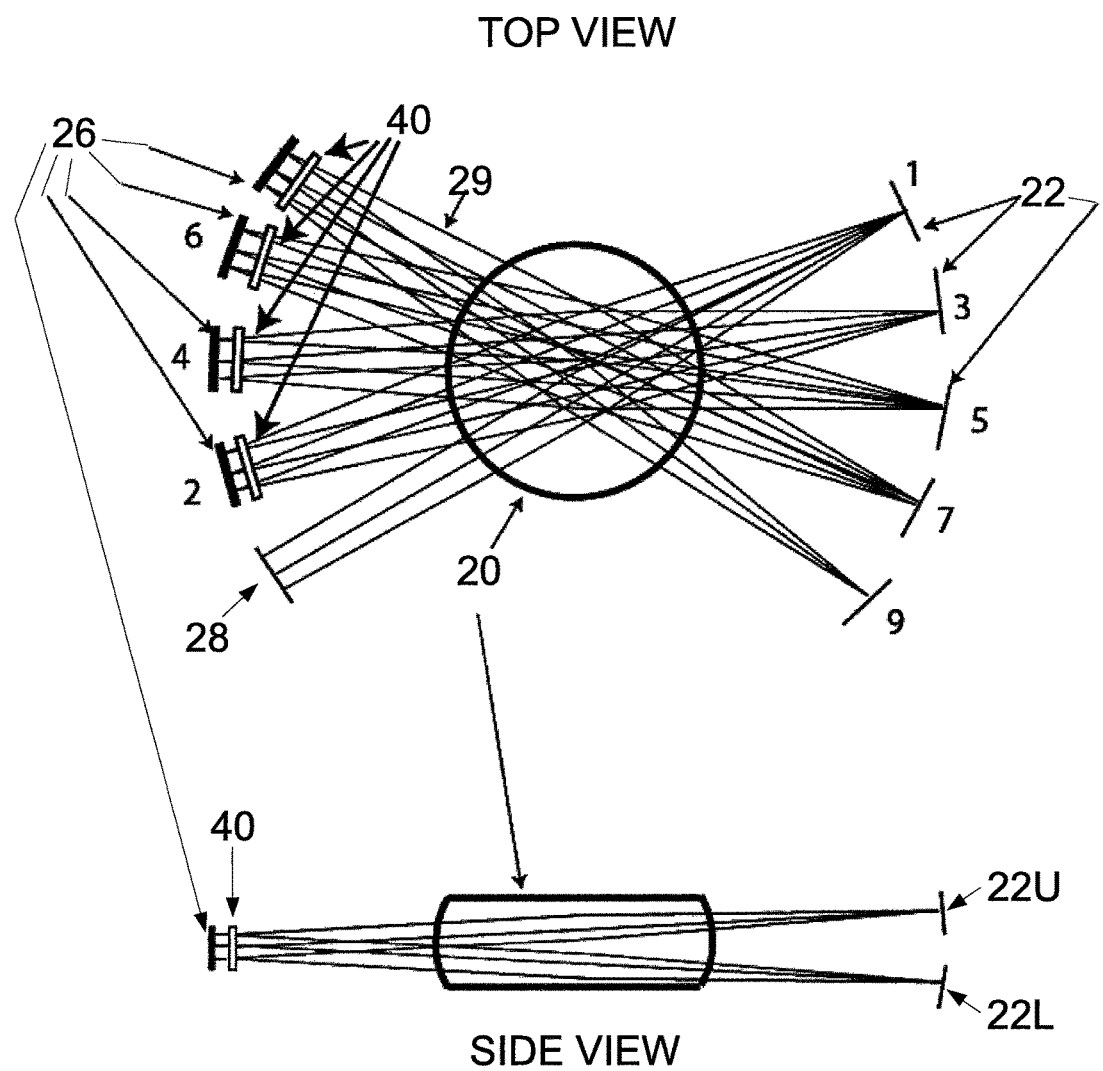
FIG. 7 diagrammatically depicts a Fourier cell using passive PGs.

With reference to FIG. 7, the case of the Fourier cell is considered. As before, there are a series of SLMs 26 on the left side of FIG. 7. These are shown as liquid crystal SLM, but could be any type of polarization-modifying spatial light modulator. The SLMs are assumed to be pixelated, and the array of input spots arranged to be imaged onto each successive SLM by each successive round trip through the cell. There are also again the spherical or disk lens 20 and Fourier mirrors 22 as described with reference to FIG. 3, and top and side views are shown in FIG. 7. Let the input beams 28 be circularly polarized, for example RCP, and light rays 29 pass through the cell. For a given beam landing on a given pixel on a given bounce, the polarization may be left as RCP, in which case the beams are deflected downward by the PG 40, or changed to LCP, in which case the beams are deflected upward by the PG 40. Some beams are sent to the lower Fourier mirror 22L and some to the upper Fourier mirror 22U. In the case of a cross-connect, the lower mirror 22L may return the spots to the same positions (row and column) from which they came, and the upper mirror 22U may move them by some number of rows or columns.

Figure 8:
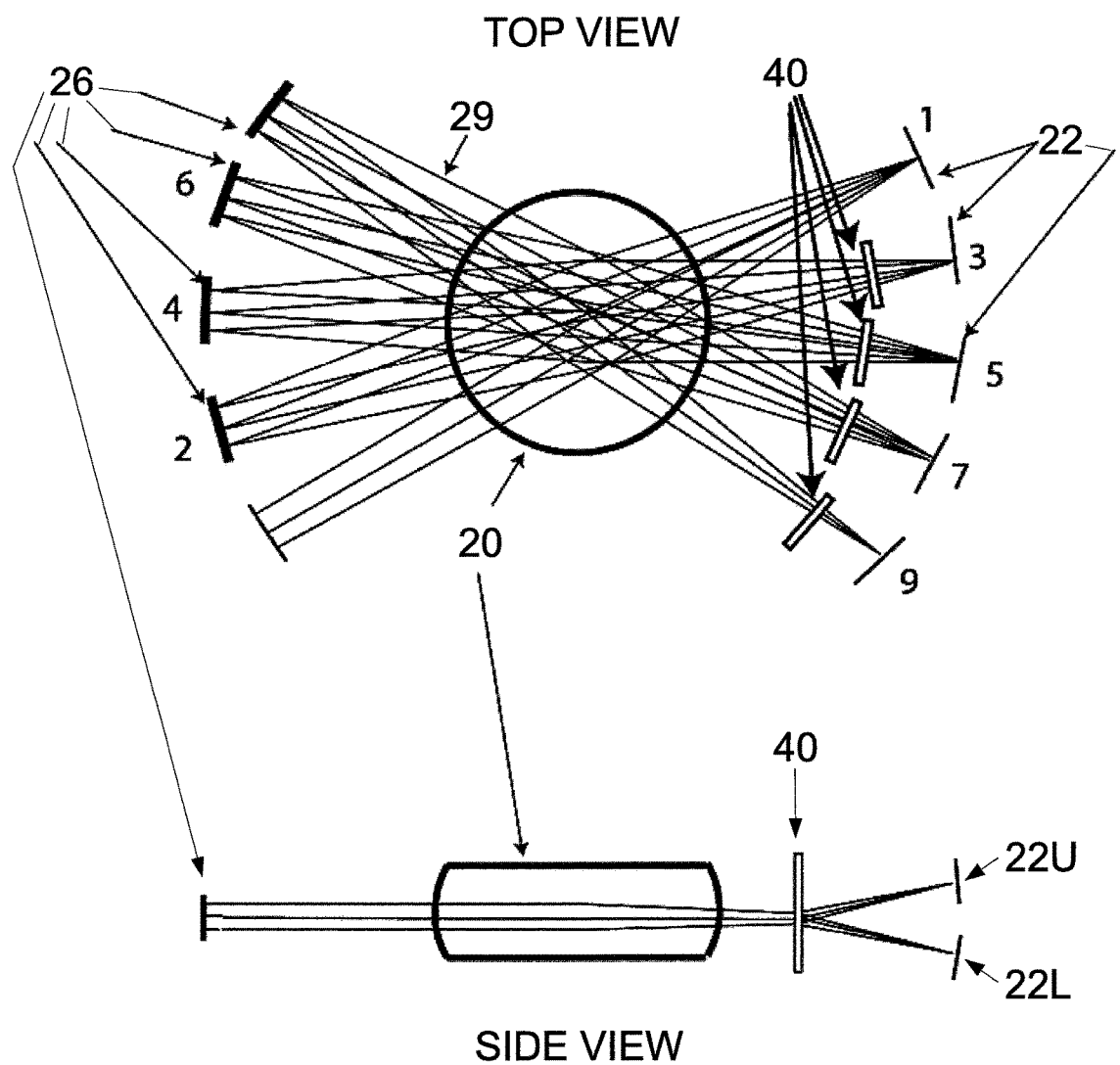
FIG. 8 diagrammatically depicts a Fourier cell with PGs on the Fourier mirror side of the cell.

With reference to FIG. 8, the PGs 24 could alternatively be on the opposite side of the lens, that is, on the side closer to the Fourier mirrors 22. In that case, the Fourier mirrors 22 may have to be closer together, or alternatively the grating period will be significantly smaller, resulting in a larger deflection angle as the beams 29 will not have had had much distance in which to separate.

In the following, embodiments employing stacked liquid crystal polarization gratings (stacked PGs) are described.

Figure 9:
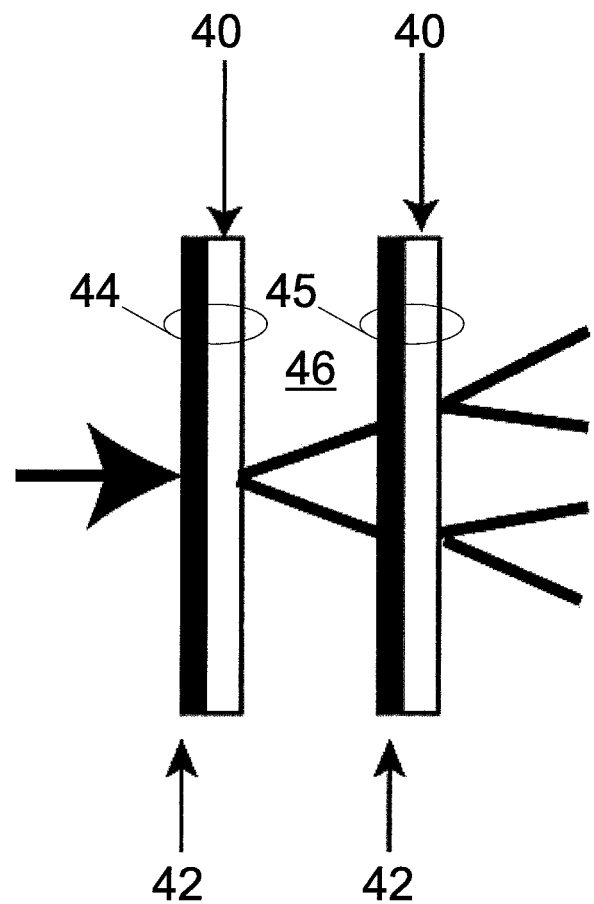
FIG. 9 diagrammatically depicts an arrangement of two stacked polarization gratings.

With reference to FIG. 9, polarization gratings 40 can be stacked with active polarization-controlling layers 42 between them, such that a beam may be steered in any of several directions. FIG. 9 shows a simple case, with only two layers 44, 45. In the first layer 44, the polarization is adjusted to direct the beam up or down at some angle. In the second layer 45, the polarization is adjusted again (if necessary) to select between two additional deflection angles. Now there are four possible deflection states. The process can be continued by adding layers to produce additional deflection angles. FIG. 9 depicts a space 46 between the layers 44, 45 for clarity, but alternatively they can be touching one another (that is, space 46 may be omitted). While these stacked PG devices are normally used to steer single beams, a pixelated version allows for a range of possible beam deflection directions, as disclosed herein.

Figure 10:
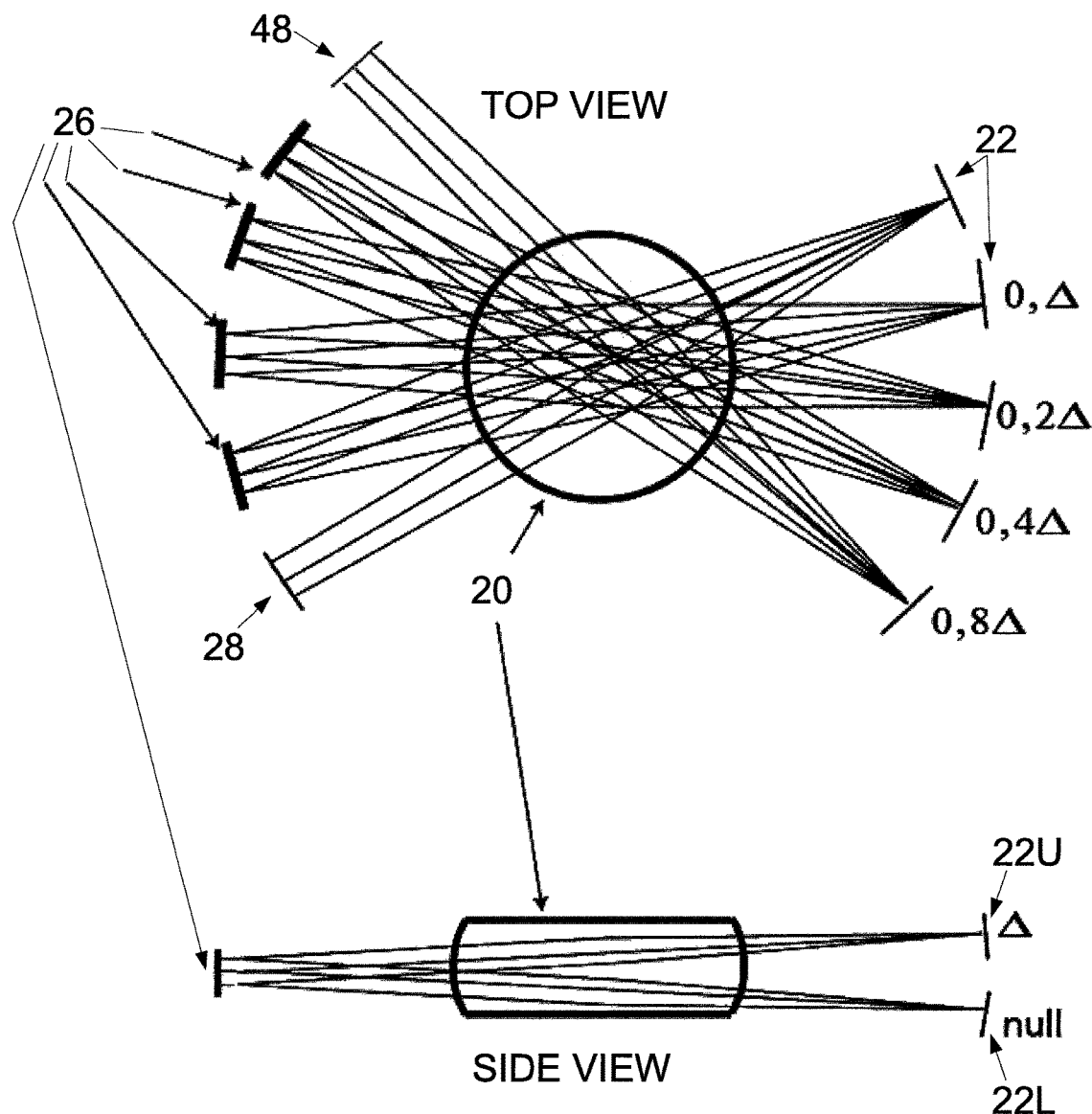
FIG. 10 diagrammatically depicts a Fourier cell with two-state SLM.

With reference to FIG. 10 (again using the Fourier cell as an example), a Fourier cell switching engine with two-state SLM paths 26 is shown. The Fourier cell of FIG. 10 also includes the spherical or disk lens 20, Fourier mirrors 22, and SLMs 26 as per previously described embodiments, and the light exits at an output plane 48. Each two-state SLM path may be implemented using (unstacked) PGs as described herein with reference to FIG. 7 or FIG. 8. It does not matter whether the device is a cross-connect or time delay device or performs some other operation. But let us consider cross-connect again as a concrete example. In the binary Fourier cell of FIG. 10, on each bounce a beam may be given a shift of zero or a shift of one row (a distance Δ). On the next bounce, the beam may be given a shift of zero or 2Δ, on the next pass a shift of 0 or 4Δ, and so on. To shift a beam by any number of rows up to N requires log 2(N+1) SLMs, for example, four bounces are needed to shift up to 15 rows.

Figure 11:
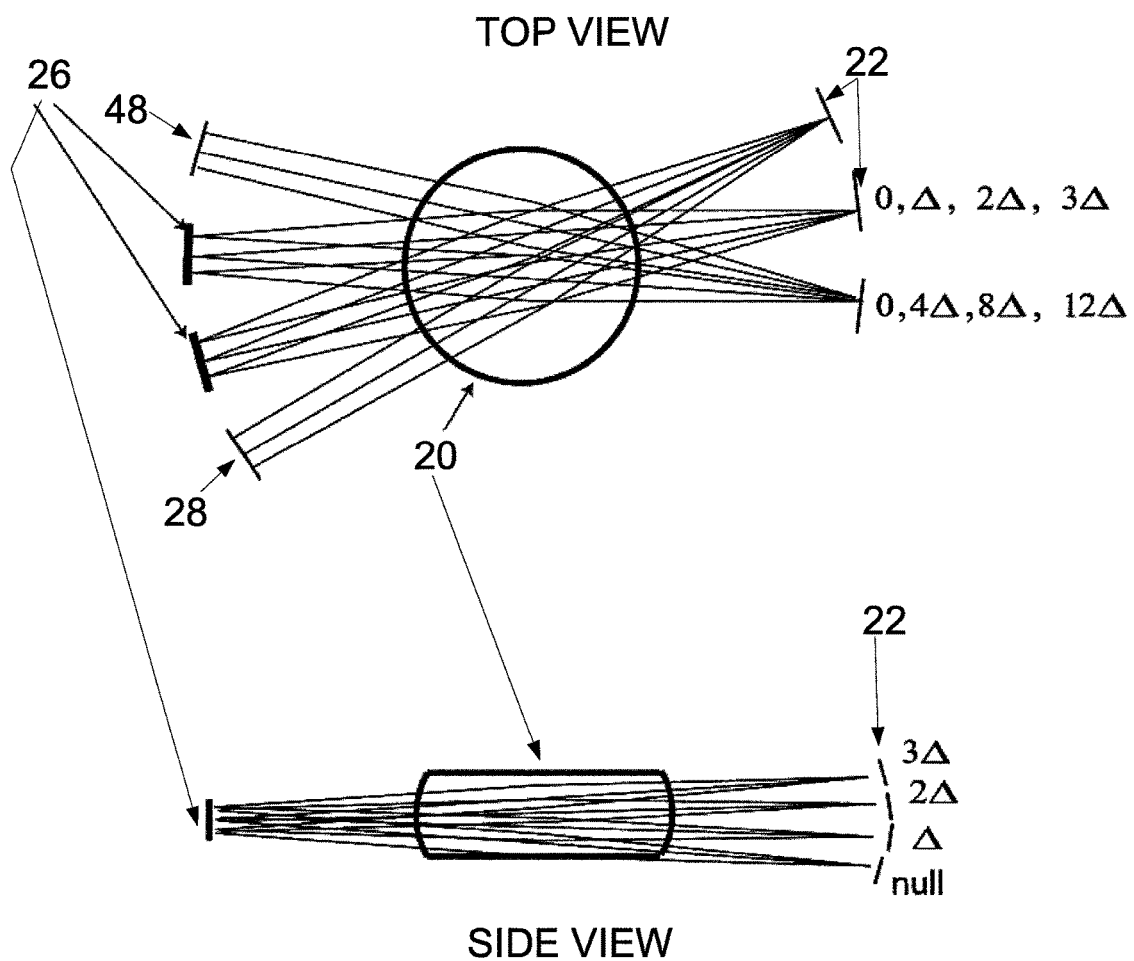
FIG. 11 diagrammatically depicts a Fourier cell with a four-state SLM.

With reference to FIG. 11, now suppose there is a four-state SLM path implemented using a stacked PG as shown in FIG. 9. (Note, the PGs are not shown in FIG. 11. In general, the PGs could be proximate to the SLMs as in FIG. 7, or proximate to the Fourier mirrors as in FIG. 8. As the side view of FIG. 11 shows the divergent beams starting at the SLM side, the PGs for this illustrative configuration are suitably at the SLM end). The Fourier cell of FIG. 11 again includes the spherical or disk mirror 20 the Fourier mirrors 22, and the SLMS 26. At each bounce (that is, each SLM path running from the object plane at the SLM to the Fourier plane at the Fourier mirror and back to the object plane), there are four choices. Now it is possible to obtain shift from 0 up to 15 in the Fourier cell of FIG. 11 using just two SLMs. For an m-state SLM path, the minimum number of SLMs required is log m(N+1). Adding additional possible states to the SLM path will increase the efficiency of the cell, reducing the number of bounces and SLMs required even more.

There is another benefit to increasing the number of states of an SLM path. If one is concerned about the reliability of the SLM 26, for example, if the SLM is a MEMS micro-mirrror array, then one could design in redundancy. In the White cell-based polynomial (quadratic, quartic, etc.) optical interconnect, as disclosed in U.S. Pat. No. 6,266,176, a failed pixel would not necessarily be a problem, since there are in general different paths to a particular output. That results from the possibility of visiting the White cell mirror that shifts by, say, Δ, more than one time. For example, if one has a quadratic cell counting in base 3, one can send a beam to a particular White cell mirror zero times, once, or twice. If the shift in question is, for example "7," then one visits the 3Δ mirror twice and the 1Δ mirror once. If one would normally visit the 1Δ mirror at the first opportunity, but if the appropriate pixel needed to send that beam to that mirror on that bounce has failed, one can simply decide to send the beam to the 1Δ mirror on a different bounce. This is true for all the polynomial cells.

A binary cell is one like that in FIG. 10. It is referred to herein as "binary" because on each bounce (that is, traversal of each SLM path running from the SLM 26 at the object plane through the lens 20 to the Fourier plane at the Fourier mirror 22 and back through the lens 20 to the object plane/SLM 26), the operation (shift or time delay) that may be selected increases by a factor of two. To get an operation of 7Δ, one must send the beam to the mirrors that produce Δ, 2Δ, and 4Δ, and there is only one set of polarizations for the bounces to do this in the device of FIG. 10.

Figure 12:
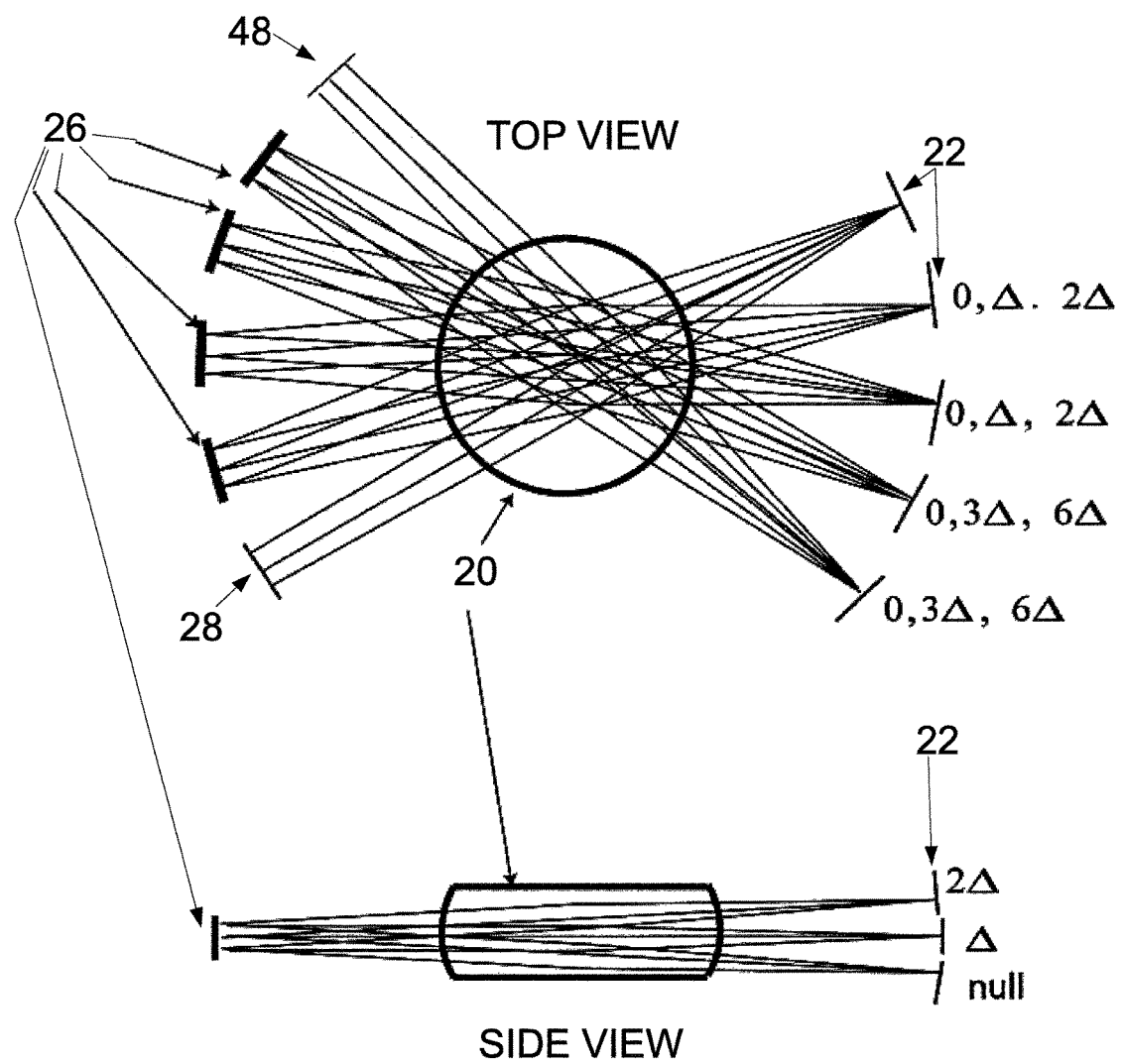
FIG. 12 diagrammatically depicts a three-state SLM in a Fourier cell that can be used to introduce redundancy.

With reference now to FIG. 12 where components corresponding to like components of FIGS. 10 and 11 are labeled with like reference numbers, it is shown how using a hypothetical 3-state SLM path one may have repeated opportunities to get an operation of Δ, 2Δ, etc.; thus, building in redundancy.

Although we a Fourier cell optical interconnection is used in these examples, it will be appreciated that the same approach will apply to White cells and other multiple bounce cells.

In the following embodiments, polarization gratings (PGs) are used as the Fourier mirrors. In the Fourier cell cross-connect, the upper and lower Fourier mirrors 22U, 22L steer the beam to different angles, so that in one case a particular beam is re-imaged to a pixel corresponding to the same row and column that it came from, and the other mirror is tilted so that the beam returns to a different beam or column. The following embodiments describe how to use the polarization gratings themselves to provide the different tilts.

Figure 13:
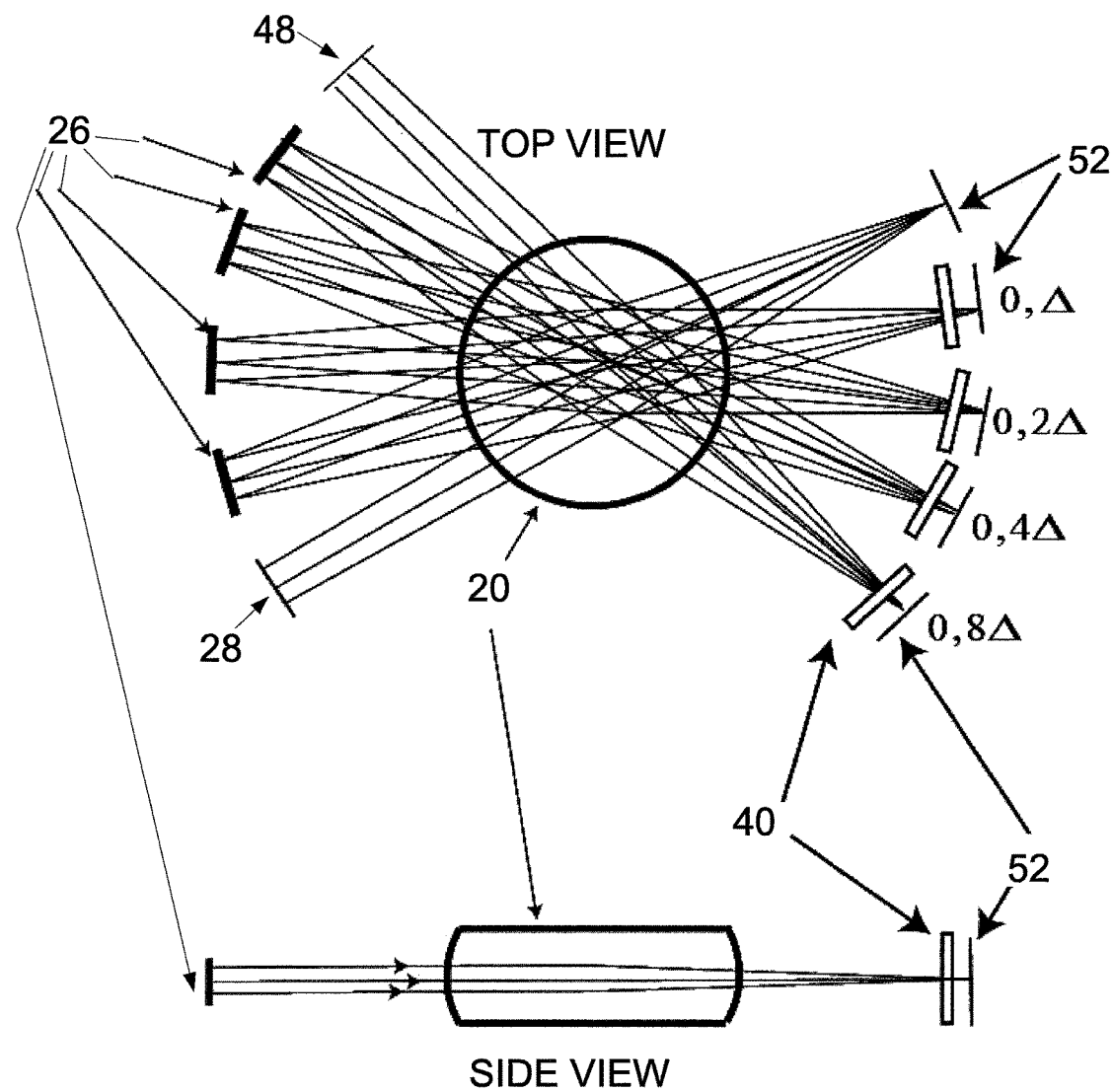
FIG. 13 diagrammatically depicts an architecture of a Fourier cell using PGs as a tilting element.

With reference to FIG. 13 where components corresponding to like components of previous embodiments are labeled with like reference numbers, in this embodiment there is (as before) a pixelated polarization-controlling spatial light modulator 26 is on the left side of the cell. Consider a two-state SLM path that can control the polarization state of a beam hitting a pixel, to select either RCP or LCP. The pair of Fourier mirrors 22U, 22L on the right side (on a given bounce) in the embodiment of FIG. 10 is replaced by a polarization grating 40 and a single flat mirror 52.

Figure 14:
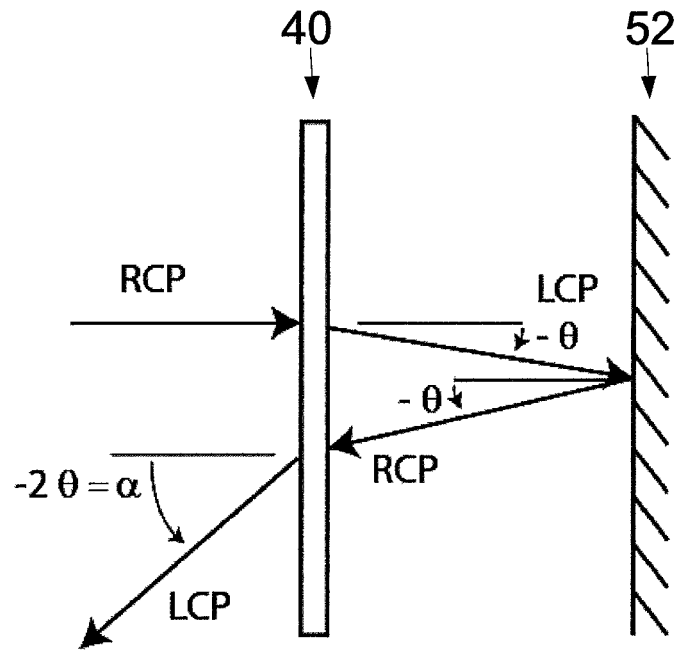
FIG. 14 diagrammatically depicts the details of the operation of the polarization grating plus the mirror.
Figure 14:
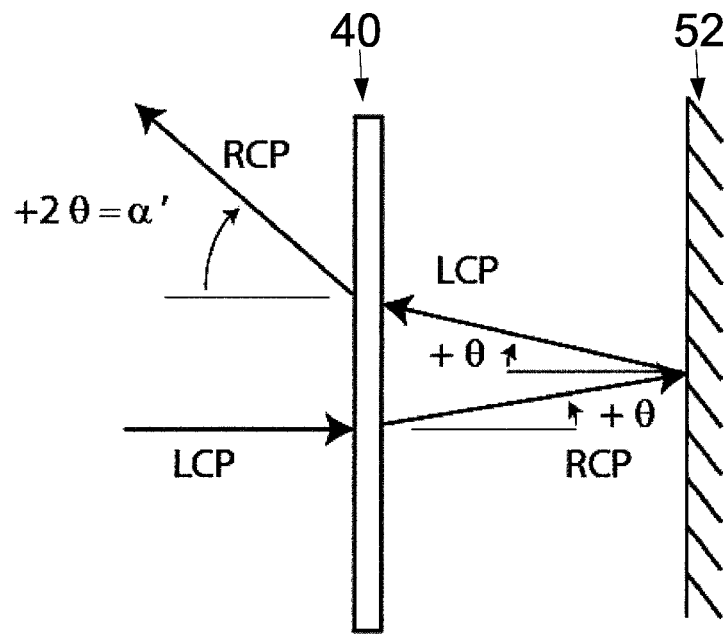

With reference to FIG. 14, operation of the Fourier cell of FIG. 13 is described. Suppose a particular beam, on a particular bounce, requires no shift. It is to be imaged to the next SLM (where it is to be understood the current and next SLM may be on a common substrate or physical unit, e.g. the next SLM could be a different set or section of pixels of the same physical first SLM unit), to a pixel in the same row and column (accounting for image inversions, which we neglect here for simplicity). The optics that replace the Fourier mirror must provide a tilt of the exact angle, a, required to re-image the beam at that location. Suppose a beam is set to right-circularly polarized (RCP) when it leaves the SLM. Let us further suppose that this particular PG 40 deflects an RCP beam downward by some angle θ. The beam then becomes LCP. On reflection from the mirror 52, the light is changed back to RCP. That beam now is incident on the PG 40 as an input angle of −θ. By the laws of gratings, it is deflected downward by another θ. The reflected beam has been deflected downward by a total of −2θ. The PG 40 and mirror 52 combination are oriented such that −2θ=α, the angle needed to image a pixel onto the row and column corresponding to its original location on the previous image.

If however, we wish to shift the beam, we instruct the spatial light modulator to set the polarization state to LCP. As shown in part (b) of FIG. 14, the beam sustains a total deflection of +2θ. We set this to α', the angle needed to shift the beam some distance Δ, either horizontally or vertically.

The arrangement of FIG. 14 is simple, but does have disadvantages. It requires very precise control of the diffraction angle of a PG 40, and each PG 40 will require a different diffraction angle.

In the following, some further alternative Fourier cell configurations are disclosed. Because in the Fourier cell arrays of beams are re-imaged multiple times, aberrations must be minimized. That means the beam's incident angles on the lens should be small. If the SLMs 26 are large, however, then the cell must be made large in diameter to keep the angles small. This could result in a very large size for the disk lens 20, with commensurately high lens manufacturing cost. Some approaches for avoiding the large disk lens 20 are next described.

Figure 15:
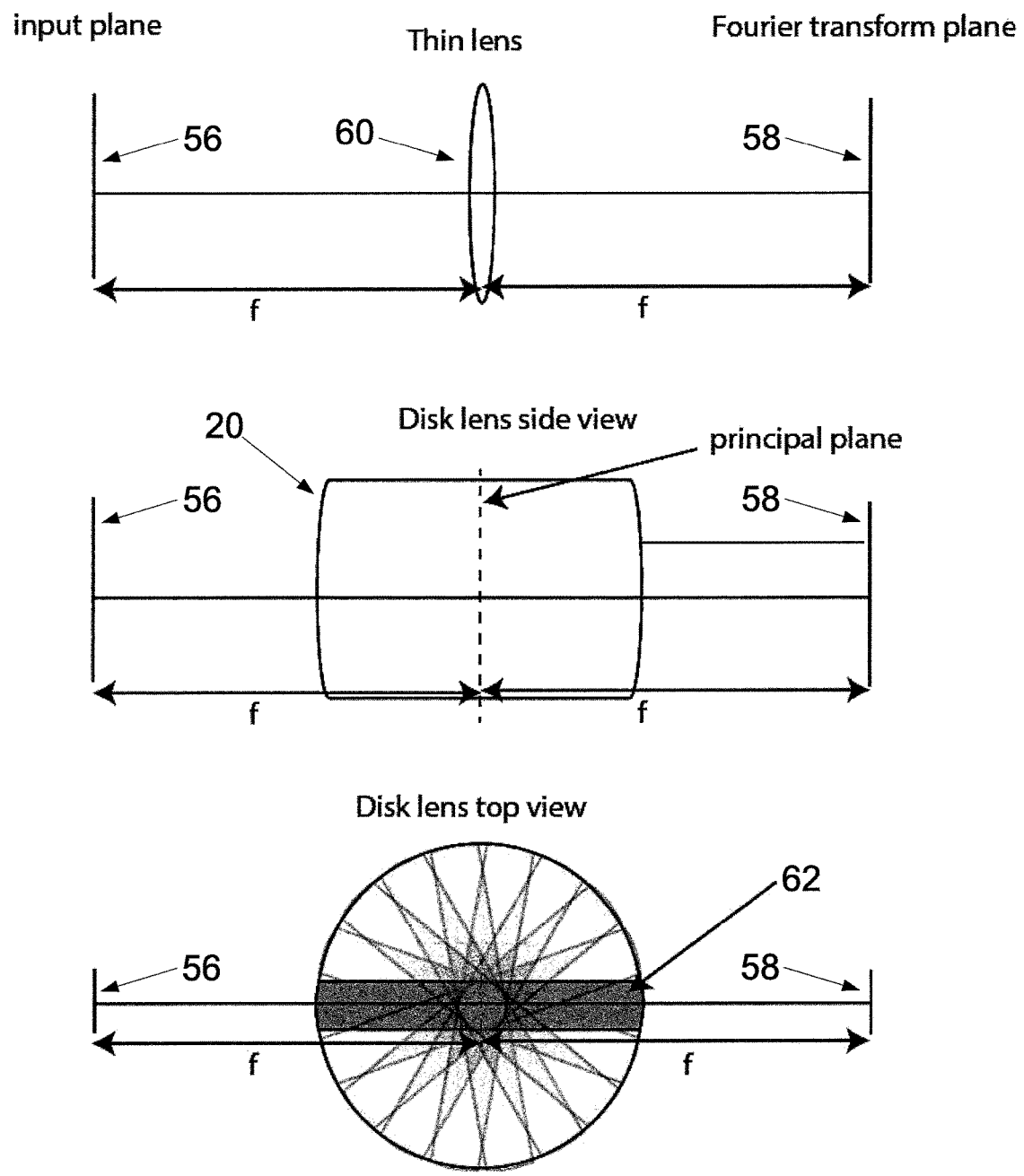
FIG. 15 diagrammatically depicts a Fourier transform system using a single thin lens (top); a side view of the Fourier cell with a disk lens (middle); and a top view of a Fourier cell using a disk lens (bottom).

With reference to FIG. 15, it is well known that an optical Fourier transform can be performed by a lens. The object is placed at the front focal plane 56 (i.e. object plane which is at the focal distance f of the lens from the lens's front principal plane) and the Fourier transform appears at the back focal plane 58 (i.e. Fourier transform plane which is at the focal distance f of the lens from the lens's back principal plane on the side opposite from the object plane). In systems laid out in a straight line, the lens generally is a thin lens 60, as shown in the top of FIG. 15, and both principal planes are in the center of the lens. By replacing the thin lens 60 by the spherical or disk lens 20 in the Fourier cell, a very compact multiple bounce system is achieved. The input plane 56 is still at the front focal plane (one focal length from the front principal plane), and the Fourier transform appears at the back focal plane 58, one focal length from the back principal plane. In this case the front and back principle planes also coincide. The center of FIG. 15 shows a side view. However, one could visualize the disk lens as series of overlapping thick lenses 62, as shown in the bottom of FIG. 15.

Figure 16:
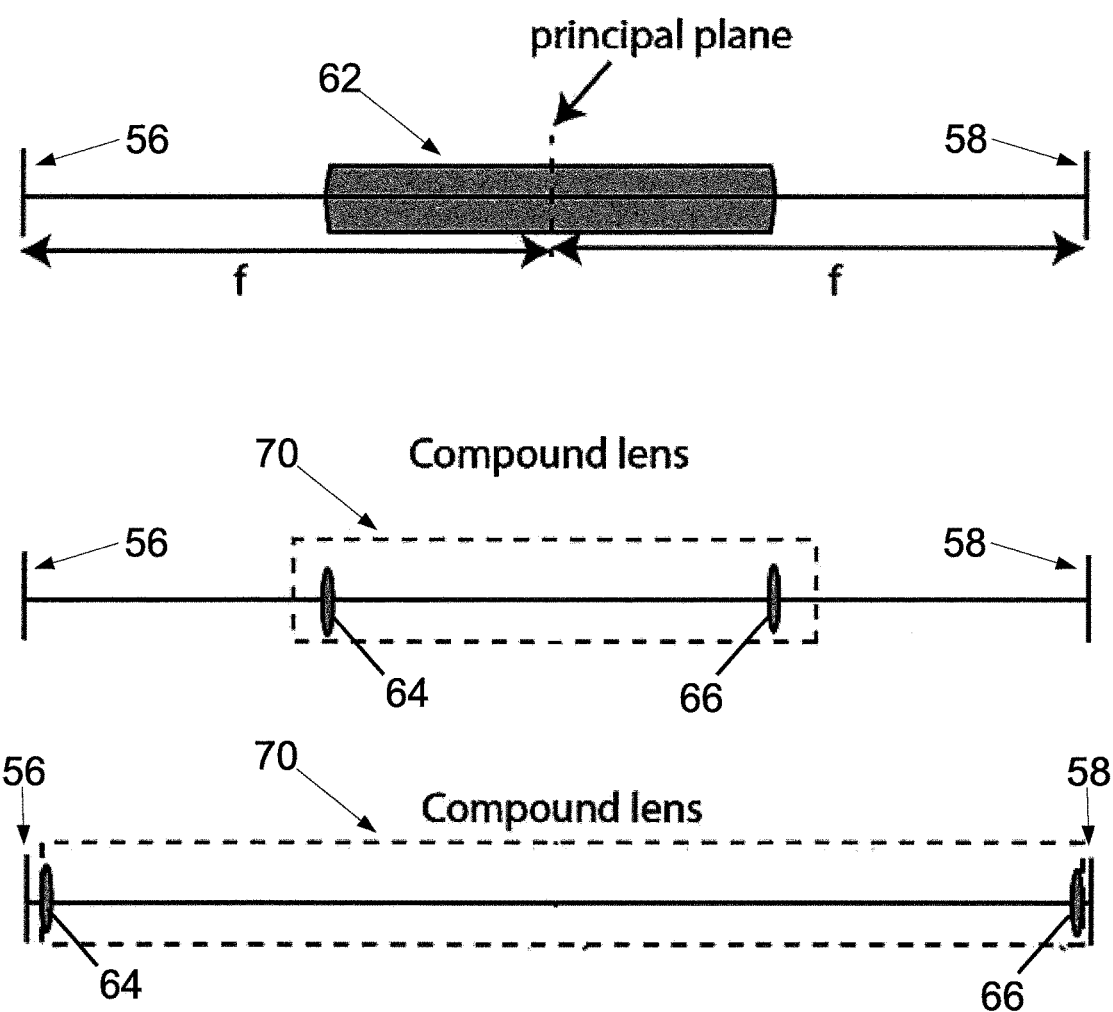
FIG. 16 diagrammatically depicts a Fourier cell using multiple discrete lens.

With reference to FIG. 16, we consider the optical system of one pass through the cell. At the top is drawn one of the imaginary thick lenses 62 from FIG. 15. In the center, the single thick lens is replaced by two thin lenses 64, 66 that form a compound lens 70 with the focal length of the thick lens. The actual focal lengths of the individual lenses 64, 66 are no longer f, but the focal length of the compound lens 70 is f. In the bottom, it is illustrated that the two single lenses 64, 66 can be placed anywhere; in the limit they could be at the front and back focal planes 56, 58. The compound lens 70, thus, can still perform the Fourier transform, as required.

Figure 17:
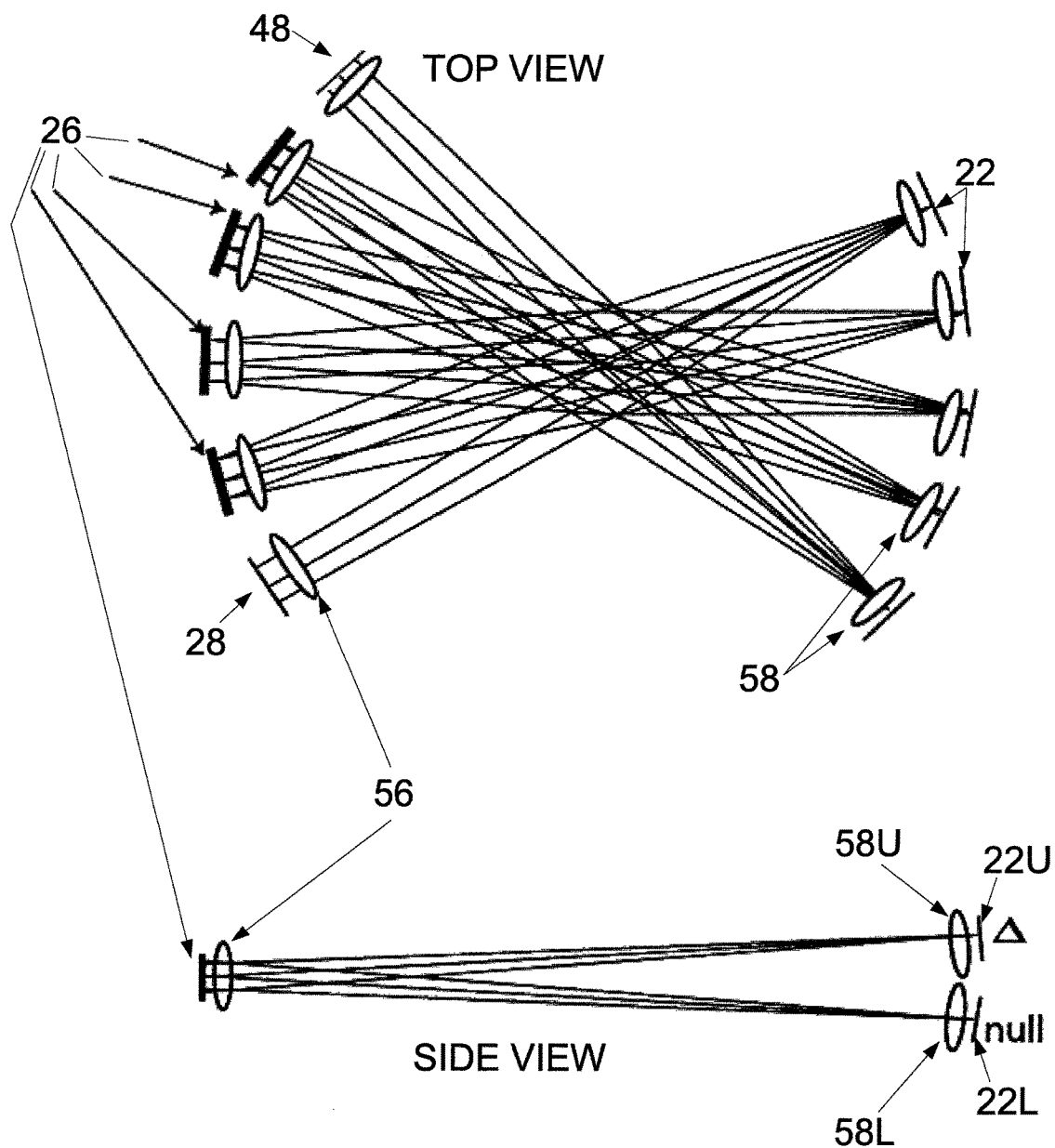
FIG. 17 diagrammatically depicts a Fourier cell using discrete lenses.

With reference to FIG. 17, using the observations of FIG. 16 it is possible to replace the central disk lens 20 by pairs of lenses 64, 66 (e.g. as a modification of the embodiment of FIG. 10) and move the lenses sufficiently far from the center (close to the SLMs 26 and Fourier mirrors 22) such that there is a separate lens for each, as shown in FIG. 17. Now, the cell can be made large enough in diameter to accommodate large SLMs without sacrificing image quality. Additionally, the two lenses 58U, 58L in front of respective Fourier mirrors 22U, 22L in the bottom (side view) of FIG. 17 may be combined into a single lens if the aberrations introduced are not excessive.

Figure 18:
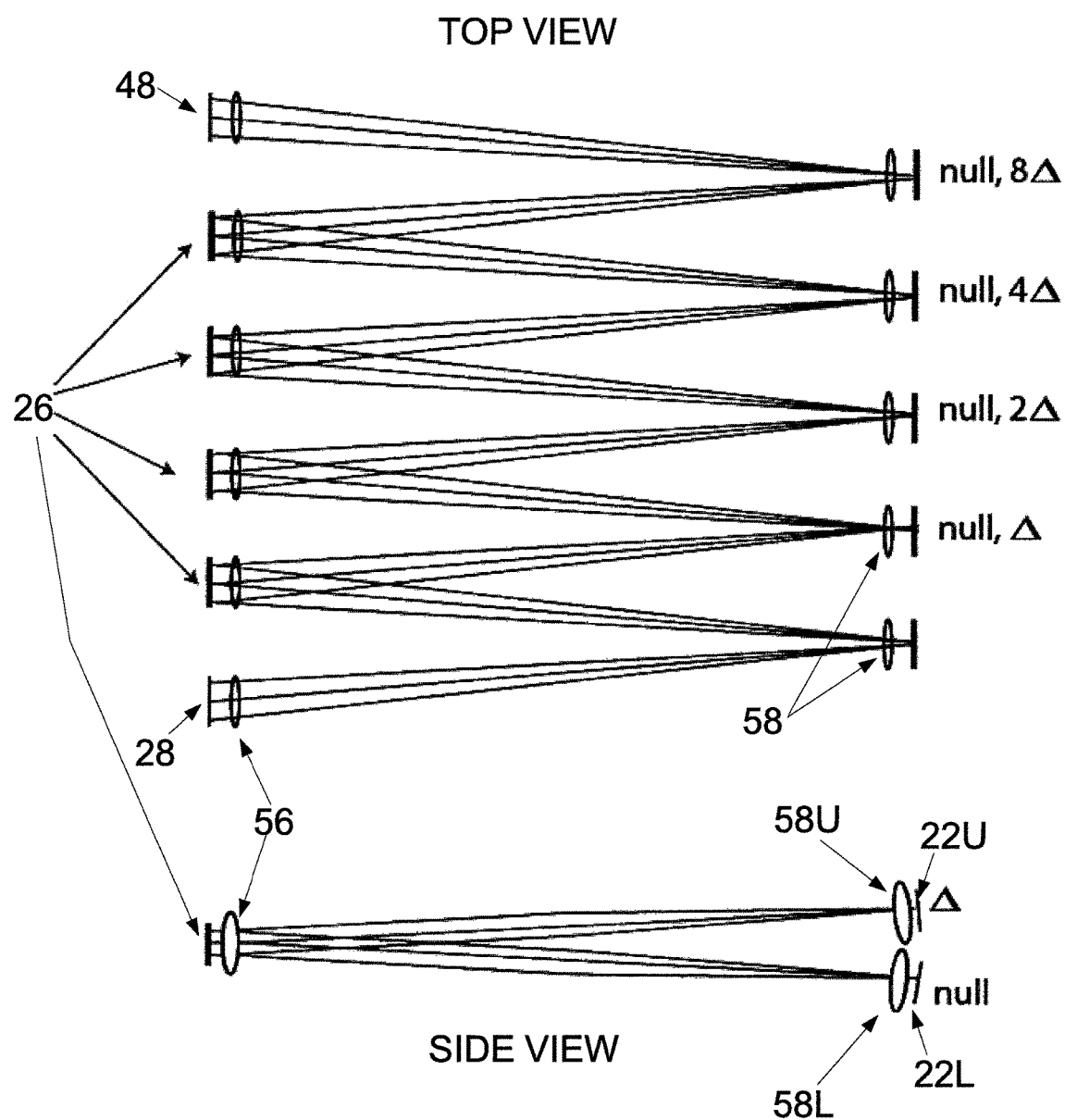
FIG. 18 diagrammatically depicts a Fourier cell using a different arrangement of mirrors in a multiple-bounce Fourier cell.

With reference to FIG. 18, where components corresponding to like components of FIG. 17 are labeled with like reference numbers, if one foregoes the single lens 20 and replaces it with a number of discrete lenses 56, 58 (as per FIG. 17), then one need not retain the circle. One might choose some other arrangement. One possible example of which is shown in FIG. 18. In this example, all the SLMs 26 are coplanar and the pairs (or sets, if there are more than two) of Fourier mirrors 22 may also be aligned in a row. Such an arrangement might, for example, be easier to assemble and align.

The preferred embodiments have been described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A multiple bounce optical cell comprising:
   optical components arranged to reflect an array of light beams received at an input plane through a plurality of bounces, wherein each bounce is defined by a sub-set of the optical components including:
   a lens;
   a pixelated polarization-controlling spatial light modulator (SLM) disposed at a front focal plane of the lens and having pixels controlling polarization states of the light beams of the array of light beams landing on the pixels;
   at least one mirror disposed at a back focal plane of the lens and arranged to reflect the array of light beams received from the SLM via the lens back through the lens to a next SLM of the next bounce of the plurality of bounces or to an output plane; and
   a polarization grating (PG) disposed in an optical path of the array of light beams between the SLM and the at least one mirror.

2. The multiple bounce optical cell of claim 1, wherein the at least one mirror of the sub-set of the optical components defining the bounce includes first and second mirrors and the PG directs each light beam of the array of light beams having a first polarization state to the first mirror and directs each light beam of the array of light beams having a second polarization state to the second mirror.

3. The multiple bounce optical cell of claim 2, wherein the first polarization state is one of left circularly polarized (LCP) and right circularly polarized (RCP) and the second polarization state is the other of LCP and RCP.

4. The multiple bounce optical cell of claim 2, wherein a time delay of the optical path between the PG and the first mirror is different from a time delay of the optical path between the PG and the second mirror whereby the multiple bounce optical cell is an optical time delay device.

5. The multiple bounce optical cell of claim 2, wherein the optical path between the PG and at least one of the first mirror and the second mirror introduces a row or column shift of the light beam in the array of light beams whereby the multiple bounce optical cell is an optical cross-connect device.

6. The multiple bounce optical cell of claim 1, wherein the at least one mirror of the sub-set of the optical components defining the bounce includes a single mirror and the PG directs each light beam of the array of light beams having a first polarization state to the single mirror at a first angle and directs each light beam of the array of light beams having a second polarization state to the single mirror at a second angle different from the first angle.

7. The multiple bounce optical cell of claim 1, wherein the PG of the sub-set of the optical components defining the bounce comprises a PG stack including two or more PGs.

8. The multiple bounce optical cell of claim 7, wherein the PG stack of the sub-set of the optical components defining the bounce further includes intervening active polarization-controlling layers whereby the PG stack produces at least four deflection angles steerable by adjustment of the active polarization-controlling layers.

9. The multiple bounce optical cell of claim 1, wherein the optical components include a disk or spherical lens, wherein the sub-set of the optical components defining each bounce includes the disk or spherical lens serving as said lens of the bounce.

10. The multiple bounce optical cell of claim 1, wherein the lens of each bounce is a compound lens and each compound lens is an optical component of a single sub-set of the optical components defining a single bounce of the plurality of bounces.

11. The multiple bounce optical cell of claim 1, wherein the PG is disposed on the same side of the lens as the SLM.

12. The multiple bounce optical cell of claim 1, wherein the PG is disposed on the same side of the lens as the at least one mirror.

13. The multiple bounce optical cell of claim 1, wherein the SLM of the sub-set of the optical components defining each bounce comprises a pixelated liquid crystal SLM.

14. The multiple bounce optical cell of claim 1, wherein the PGs of the plurality of bounces are passive polarization gratings.

15. A multiple bounce optical cell comprising:
optical components arranged to reflect an array of light beams received at an input plane through a plurality of bounces, wherein each bounce is defined by:
a compound lens;
a pixelated polarization-controlling spatial light modulator (SLM) disposed at a front focal plane of the lens and having pixels controlling polarization states of the light beams of the array of light beams landing on the pixels;
at least one mirror disposed at a back focal plane of the lens and arranged to reflect the array of light beams received from the SLM via the lens back through the lens to a next SLM of the next bounce of the plurality of bounces or to an output plane; and
a switching device comprising at least one polarizing beamsplitter (PBS) or polarization grating (PG) disposed in an optical path of the array of light beams between the SLM and the at least one mirror, the switching device directing the light beams along different paths depending upon the polarization states of the light beams,
wherein each compound lens is a defining optical component of a single bounce of the plurality of bounces.

16. The multiple bounce optical cell of claim 15, wherein the switching device comprises a polarizing beamsplitter (PBS).

17. The multiple bounce optical cell of claim 15, wherein the switching device comprises a polarization grating (PG).

18. The multiple bounce optical cell of claim 15, wherein the switching device comprises a stack of two or more polarization gratings (PGs) directing the light beams along different at least four different paths depending upon the polarization states of the light beams.

19. The multiple bounce optical cell of claim 15, wherein the at least one mirror includes first and second mirrors and the switching device directs each light beam of the array of light beams having a first polarization state to the first mirror and directs each light beam of the array of light beams having a second polarization state to the second mirror.

20. The multiple bounce optical cell of claim 15, wherein the SLMs of the plurality of bounces are arranged in a single plane.

21. A multiple bounce optical cell comprising:
optical components arranged to reflect an array of light beams received at an input plane through a plurality of bounces;
wherein each bounce is defined by a sub-set of the optical components including a pixelated polarization-controlling spatial light modulator (SLM), at least one mirror, and a polarization grating (PG) disposed in an optical path of the array of light beams between the SLM and the at least one mirror.

22. The multiple bounce optical cell of claim 21, wherein the at least one mirror of the sub-set of the optical components defining each bounce includes at least two mirrors and the PG of the sub-set of the optical components defining each bounce directs each light beam of the array of light beams to one mirror of the at least two mirrors determined by the polarization state of the light beam.

23. The multiple bounce optical cell of claim 22, wherein the at least two mirrors of the sub-set of the optical components defining each bounce includes at least four mirrors and the PG of the sub-set of the optical components defining each bounce comprises a stack of two or more PGs.

24. The multiple bounce optical cell of claim 21, wherein the at least one mirror of the sub-set of the optical components defining each bounce includes a single mirror and the PG of the sub-set of the optical components defining each bounce directs each light beam of the array of light beams having a first polarization state to the single mirror at a first angle and directs each light beam of the array of light beams having a second polarization state to the single mirror at a second angle different from the first angle.

* * * * *